Feb. 27, 1962  W. BRIGHT  3,022,993
MOTOR VEHICLE SEAT
Filed June 15, 1959  3 Sheets-Sheet 1

WILFRED BRIGHT
INVENTOR.

BY J. R. Faulkner
J. J. Roethel

ATTORNEYS

Feb. 27, 1962

W. BRIGHT 3,022,993

MOTOR VEHICLE SEAT

Filed June 15, 1959

WILFRED BRIGHT
INVENTOR.

BY J. R. Faulkner
J. J. Roethel

ATTORNEYS

Feb. 27, 1962 W. BRIGHT 3,022,993
MOTOR VEHICLE SEAT
Filed June 15, 1959 3 Sheets-Sheet 3

WILFRED BRIGHT
INVENTOR.

BY J. L. Faulkner
J. J. Roethel

ATTORNEYS

United States Patent Office 3,022,993
Patented Feb. 27, 1962

3,022,993
MOTOR VEHICLE SEAT
Wilfred Bright, Pech, uber Bad Godesberg, Germany, assignor to Ford Motor Company, Dearborn, Mich., a corporation of Delaware
Filed June 15, 1959, Ser. No. 820,432
Claims priority, application Germany June 27, 1958
4 Claims. (Cl. 267—107)

This invention relates generally to a spring seat construction for use in vehicles, and more particularly to a seat construction embodying wire springs of sinuous or zig-zag shape arranged in a substantially horizontal pattern.

Much work has been done in the field of furniture design in providing anatomic or contour chairs or the like which, in addition to providing vertical support, have a back rest structure providing support for the back or, more particularly, the backbone, in such manner as to prevent a sitting person from overtiring. It is not possible, however, to readily appropriate the furniture back rest structures to solve motor vehicle seating problems. The problem of supplying proper vertical and lateral support for a person in a moving vehicle is substantially different than that for providing equivalent support on a stable platform.

In vehicle seating, the use of sinuous or zig-zag spring elements has found wide acceptance. Vehicle seats are known to the art in which the sinuous springs forming the back rest are arranged at predetermined distances or spacings horizontally. These are fastened with their ends to an edge wire. In most cases, these springs are of the same thickness and of the same rigidity under stress. In these conventional arrangements there are provided V-shaped or fishmouth portions at angles on each side of the back rest, which portions consist of special single springs or spring loops of compound design. Such type of back rest, however, does not give an anatomic support for the backbone, as the spring portions under greatest stress always are bent the most. These conventional structures also do not solve the further problem of providing a steady and smooth bending action from the right and left-hand sides up to the middle all over the vertical height of the back rest.

The problem might be solved by providing helper springs behind the vertical sinuous springs. Although the helper springs may be constructed and arranged to provide the proper anatomical support for the backbone, the use of the additional springs complicates and increases the cost of the structure.

It is an object of the present invention to provide a construction and arrangement in which one or more of the horizontally disposed sinuous or corrugated springs are of greater rigidity, that is, have the lowest bending under load, compared with the remaining springs. In one embodiment, the most rigid spring (or springs) is arranged in a lower part of the seat back or back rest in position to support the backbone. The rigidity of the springs is gradually decreased vertically on both sides of the most rigid spring or springs. The backbone is thus supported properly in the desired place by most simple means and at the lowest expense. The occupant of the seat is effectively protected against overtiring on long rides by proper support of the backbone.

A further feature of the invention is that the remaining springs are selectively of different rigidity. The horizontal top sinuous spring, especially, as compared with the other springs of the upper part of the back rest, is of relatively higher rigidity. Thus, it is an object of the present invention not only to provide proper support for the backbone through properly strengthened springs within the lower part of the back rest, but also to provide a properly strengthened spring below the top frame of the back rest which is also effective to prevent over-tiring. The wave crests and wave troughs of the most rigid spring or springs, in comparison with the remaining springs, are designed with a larger radius of curvature. In a further embodiment of the invention, the most rigid as well as all the other springs are constructed as a horizontal continuous one-part wave train whose end loops are fastened to the right and left-hand side of the frame. The transition from the end loops to the middle part of the spring is through an offset fishmouth shaped portion. This type of construction provides a wrap-around effect, that is, an easy chair-like effect for seats of motor vehicles. The inner part of this construction and arrangement is bent more than the side part under stress, as in a conventional manner. However, a steady proportional, proper, squeak free, elastic function of back rest is guaranteed by the angular fishmouth shaped portions which is very comfortable for the seat occupant.

Other objects and advantages of this invention will be made more apparent as this description proceeds, particularly when considered in connection with the accompanying drawings, wherein.

Figure 1:
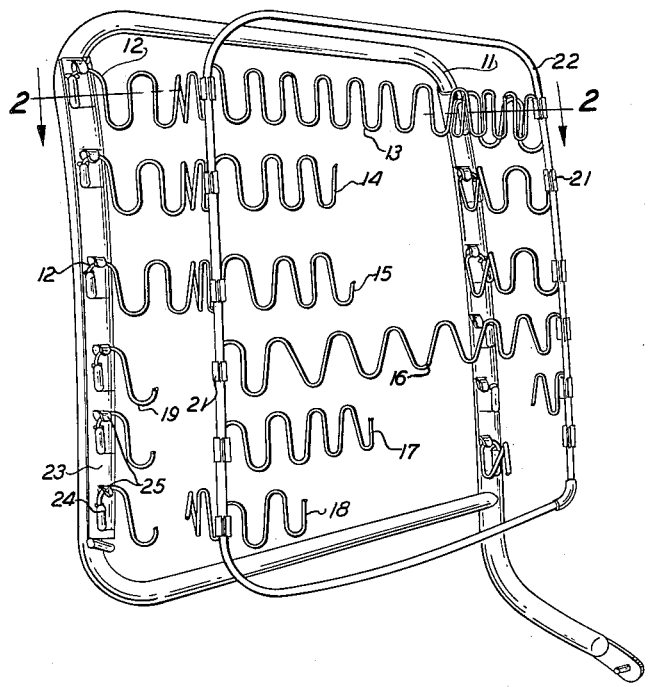
FIG. 1 is a perspective view of a back rest constructed in accordance with the present invention before it is covered with upholstery material.
Figure 2:
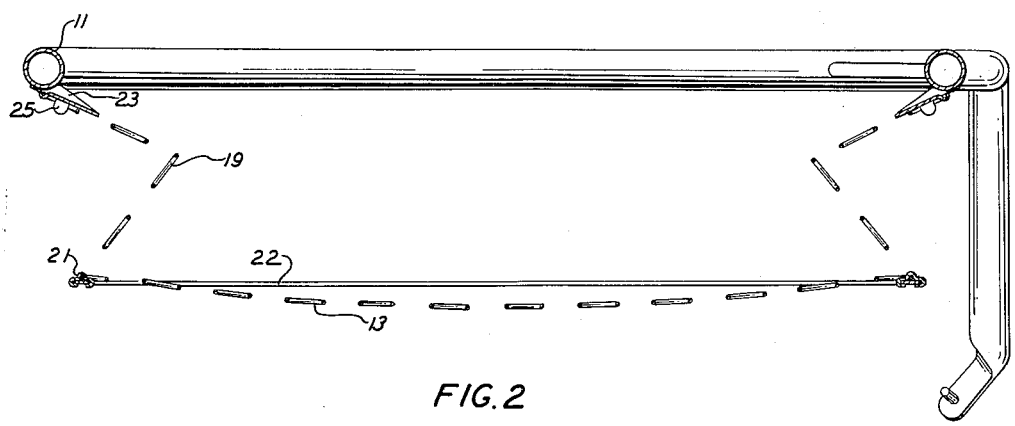
FIG. 2 is a sectional view of the back rest taken substantially through line 2—2 of FIG. 1 looking in the direction of the arrows.

Referring now to the drawings, there is illustrated in FIG. 1 a back rest of a seat having a frame 11 to which are fastened the end loops 12 of horizontally arranged sinuous springs 13, 14, 15, 16, 17 and 18. These sinuous springs are provided with the conventional fishmouth shaped portions 19 at angles at both sides of the back rest, as can be especially well seen at the left-hand side of FIG. 1. The horizontally disposed one-part spring trains 13 to 18, inclusive, are respectively fastened at the transition point from the inner portion of the fishmouth 19 to the horizontally extending portion with the aids of clamps 21 to an edge wire 22.

Figures 3, 4:
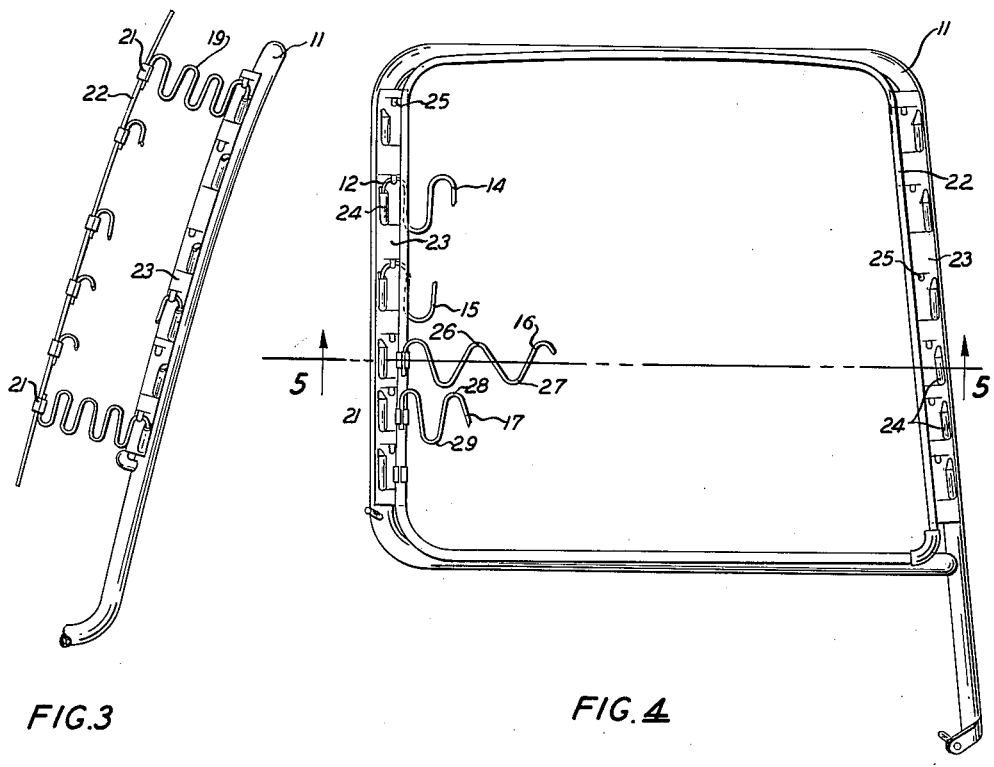
FIG. 3 is a side elevation of the back rest.
FIG. 4 is a front elevation of the back rest.
Figure 5:
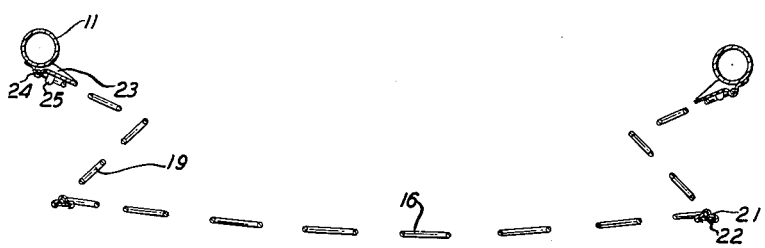
FIG. 5 is a sectional view taken substantially through the line 5—5 of FIG. 4 looking in the direction of the arrows.

FIG. 3 illustrates in detail the arrangement in fastening of the offset or fishmouth piece 19 between the edge wire 22 and frame 11. The ends of the sinuous spring, for example, spring 18, are each fastened to a plate panel 23 welded to frame 11. The plate panel part to be fastened to the frame is curved complementarily to frame shape, for example, in case of a tubular frame the panel part is curved at a radius equal to the radius of curvature of the frame portion. Each plate panel 23 is provided with longitudinally extending cyclindrically shaped spring end receiving pockets 24, the pockets being opened at the one end and substantially closed at the other. The spring end 12 is inserted through the pocket 24 and secured against actual displacement by means of a semicircle shaped lug 25 formed out of the metal of the panel 23. When the spring is in place the lug is bent over to act as a retainer. A panel 23 may be formed in a single piece to hold the spring 18 in its proper vertical position with relation to the distribution of the other springs.

The terminal edge of the fishmouth portion is fastened in conventional manner by fastening clamps 21 to the edge wire 22.

Referring now to FIG. 4, there is illustrated the form and arrangement of the most rigid spring 16. This spring is preferably disposed in the lower portion of the seat back frame and might be considered the terminal spring of the lower third portion of the back frame. Although only one spring 16 is shown, there may be more than one arranged in proximity to one another. The desired rigidity may be attained either by using thicker spring wire, by using less resilient spring steel and/or by using a special type of spring loop. As illustrated, the spring 16 may be designed so that the spring loops at the wave crest 26 and trough 27 shows a smaller radius of curvature than the respective or corresponding wave crests 28 and troughs 29 of the other springs (see FIG. 4). However, it will be understood that the most rigid spring 16 terminates in a conventional fishmouth portion in the same manner as the other springs. The total number of springs used in the seat back is optional, that is, there may be five, six or more. The springs may be so arranged that the spring 16 shows highest rigidity, the spring 15 a smaller rigidity and the spring 14 yet a smaller rigidity. Going in the other direction, the spring 17 may show in contrast to spring 16 a smaller rigidity. Such a gradual decrease guarantees an especially comfortable support of the backbone area.

As a further embodiment of the invention the top spring 13 may again show a relatively higher rigidity in comparison to springs 14 and 15. Usually, however, it will be smaller than, or the same as of spring 16.

As an economy measure the spring 16 may be produced from the same sinuous stock as the spring 17. It is only necessary to prestretch a predetermined portion of the spring stock from which the spring such as spring 17 is made so that the curve of each wave crest and trough is decreased, that is, so that the radius of curvature is enlarged. The length of the section thus enlarged will, of course, substantially correspond with the interval between two fastening clamps 21 on two opposite points of the edge wire 22. The remaining part of this prestretched spring used for the fishmouth is of the same elasticity, and it must be, as that of the other springs to obtain equal wraparound effect.

Figures 6, 7:
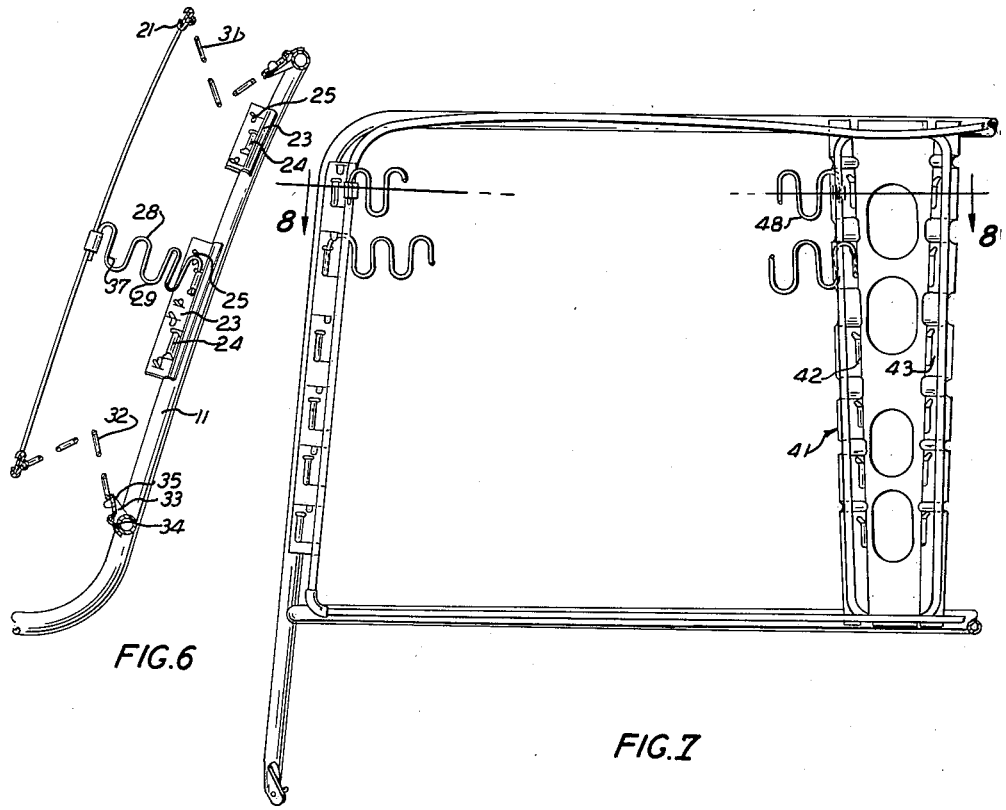
FIG. 6 is a view in part similar to FIG. 3 illustrating a second embodiment of the present invention.
FIG. 7 is a front elevation of a further embodiment of the present invention.

A further embodiment of the invention is illustrated in FIG. 6. This embodiment of the invention utilizes special fishmouth sections 31 and 32 disposed at the top and bottom between the edge wire 22 and frame 11. A panel 33 analogous to panel 23 is applied with a curved part 34 fitted and welded to the tube frame. The panel 33 is fastened to the horizontal top and bottom part of the tube frame with the flange 35 disposed in a direction paralleling the spring sides of springs 31 and 32 which are received in pockets 36. The ends of the loops are supported axially by lugs 25. The opposite ends of each V-shaped or fishmouth special spring section 31 and 32 is fastened by fastening clamps 21 arranged at the edge wire 22. Additional fishmouth sections might be supplied at the right and left-hand sides of the seat back frame, such fishmouth sections being identified by the reference numeral 37. Multisection panels 23 would be supplied to fasten the ends of the horizontal springs. The loop ends would be inserted and axially secured by lugs 25.

It will be understood that the invention is not limited to use only in a seat back but may according to requirements and seat shapes be developed in other respects, that is, the arrangement of the strengthened springs of horizontal direction may also be used for the seat cushion itself. The desired shape and support in the seat cushion may be thus obtained.

Figure 8:
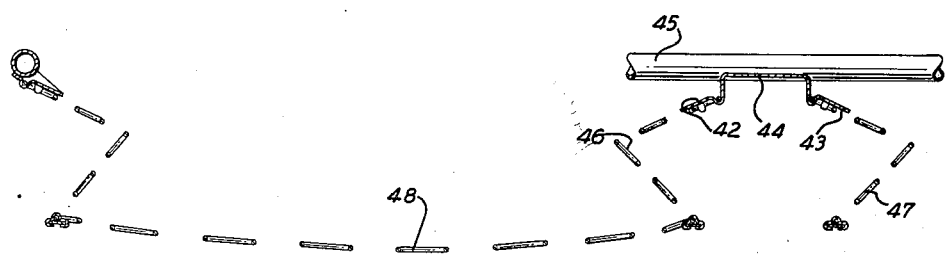
FIG. 8 is a sectional view taken substantially through line 8—8 of FIG. 7 looking in the direction of the arrows.

In FIGS. 7 and 8 there is illustrated an embodiment of the invention in which the seat backs are arranged to provide for two seats. In this construction and arrangement a panel 41 is provided in the middle of the seat composed of two side parts 42 and 43. These are rigidly fastened at the bottom and top of the one-piece frame by spot welding or the like and are positioned reasonably close to each other. Intermediate pieces 44 serve the space between the side parts 42 and 43, these intermediate pieces also being welded to the frame 45. The end portions forming the fishmouth shape portions 46 and 47 of the horizontal wires 48 are also fastened to the edge wire 22 and then form V-shape fishmouth appearance shown in FIG. 8.

It would, however, be possible to produce the panel in one-piece and thus bring the V-shaped or fishmouth portions at 46 and 47 closer together. The panel 41 would always be arranged nearly in the middle of the back rest.

It will be understood that the invention is not to be limited to the exact construction shown and described, but that various changes and modifications may be made without departing from the spirit and scope of the invention as defined in the appended claims.

What is claimed is:

1. A seat structure comprising a frame, a plurality of formed wire spring elements, and means securing said spring elements to opposite side elements of said frame in parallel spaced relationship, said spring elements being of varying relative rigidity, at least two of the more rigid of said spring elements having less rigid spring elements interposed therebetween to provide varying degrees of localized anatomical support.

2. A back rest structure for a vehicle seat comprising a frame, a plurality of sinuous wire spring elements, and means securing said spring elements to opposite vertical elements of said frame in horizontal spaced relationship, said spring elements being of varying relative rigidity, the uppermost of said spring elements and an intermediate spring element being the most rigid and having less rigid spring elements interposed therebetween to provide varying degrees of vertical anatomical support.

3. A back rest structure for a vehicle seat comprising a frame, a plurality of sinuous wire spring elements, and means securing said spring elements to opposite vertical elements of said frame in spaced horizontal relationship, said spring elements being of variable relative rigidity, the most rigid of said spring elements being located within the lower part of said back rest to provide localized support for the backbone of a seat occupant and the next most rigid of said spring elements being located adjacent the upper edge of said back rest structure.

4. A back rest structure for a vehicle seat comprising a frame, a plurality of sinuous wire spring elements, and means securing said spring elements to opposite vertical elements of said frame in spaced horizontal relationship, said spring elements having wave troughs and wave crests of differing radii of curvature whereby said spring elements differ in relative rigidity, the most rigid of said spring elements beign located within the lower part of said back rest to provide localized support for the backbone of a seat occupant, the rigidity of said spring elements decreasing in either direction from said most rigid element except for the uppermost spring element which is of a higher order of rigidity.

References Cited in the file of this patent

UNITED STATES PATENTS

| | | |
|---|---|---|
| 2,639,763 | Neely | May 26, 1953 |
| 2,702,078 | Flint | Feb. 15, 1955 |
| 2,709,483 | Weinberger | May 31, 1955 |
| 2,764,227 | Williams et al. | Sept. 25, 1956 |
| 2,829,880 | Staples et al. | Apr. 8, 1958 |
| 2,836,226 | Fridolph | May 27, 1958 |

FOREIGN PATENTS

| | | |
|---|---|---|
| 800,185 | Germany | Oct. 12, 1950 |